US005448779A

United States Patent [19]

Aldridge

[11] Patent Number: 5,448,779

[45] Date of Patent: Sep. 12, 1995

[54] LIMITED-STRETCH, PERMANENTLY FIRE-RESISTANT SUSPENDERS

[75] Inventor: Donald Aldridge, New Carlisle, Ohio

[73] Assignee: Lion Apparel, Inc., Dayton, Ohio

[21] Appl. No.: 41,392

[22] Filed: Mar. 31, 1993

[51] Int. Cl.[6] .......... A41F 15/00; B32B 7/00; B32B 27/14

[52] U.S. Cl. .......... 2/326; 2/243.1; 2/338; 57/210; 57/225; 57/226; 428/231; 428/257; 428/377

[58] Field of Search .......... 2/243.1, 326, 327, 328, 2/329, 330, 331, 332, 333, 310, 335, 69, 69.5, 93, 300–325; 57/210, 225, 226, 232; 428/231, 373, 377, 378, 225, 229, 257

[56] References Cited

U.S. PATENT DOCUMENTS

| | | | |
|---|---|---|---|
| 1,880,779 | 10/1932 | Cahn | 2/326 |
| 2,628,928 | 2/1953 | Cadous | 2/338 |
| 3,180,115 | 4/1965 | Marshall | 57/225 X |
| 3,901,579 | 8/1975 | Demerest | 2/326 X |
| 4,202,382 | 5/1980 | Westhead | 428/257 X |
| 4,507,806 | 4/1985 | Combs . | |
| 4,533,594 | 8/1985 | Buchman | 428/257 X |
| 4,573,217 | 3/1986 | Reed | 2/84 X |
| 4,850,057 | 7/1989 | Schierenbeck | 2/325 X |
| 4,921,756 | 5/1990 | Tolbert et al. . | |
| 4,927,698 | 5/1990 | Jaco et al. . | |
| 4,967,421 | 11/1990 | Grilliot et al. . | |
| 4,996,099 | 2/1991 | Cooke et al. . | |
| 5,069,957 | 12/1991 | Vandermeersch . | |
| 5,129,105 | 7/1992 | Kleinman | 2/326 X |
| 5,386,593 | 2/1995 | Kleinman . | |

*Primary Examiner*—Jeanette E. Chapman

*Attorney, Agent, or Firm*—Killworth, Gottman, Hagan & Schaeff

[57] ABSTRACT

Firefighters' suspenders having limited-stretch capability and constructed of permanently fire-resistant materials are provided. The suspenders have a plurality of elastic straps, having first and second ends, and are constructed of fibers containing an elastic core, a fire-resistant intermediate layer wrapped around the elastic core, and a permanently fire-resistant outer layer wrapped around the elastic core and intermediate layer. These fibers are woven in a crosslinked pattern with a permanently fire-resistant yarn. Joined collectively to the first ends of the elastic straps are the first ends of at least two nonelastic straps comprising a permanently fire-resistant fabric. The second ends of the elastic and nonelastic straps contain clips for fastening the suspenders to the pants of firefighters. The elastic straps give the suspenders limited-stretch capability. The permanently fire-resistant outer layer and the permanently fire-resistant crossweave of the elastic straps, along with the permanently fire-resistant fabric of the nonelastic straps, make the suspenders permanently fire-resistant.

2 Claims, 2 Drawing Sheets

LIMITED-STRETCH, PERMANENTLY FIRE-RESISTANT SUSPENDERS

BACKGROUND OF THE INVENTION

The present invention relates to firefighters' suspenders having limited-stretch capability and constructed of permanently fire-resistant materials.

Flame-resistant suspenders for firefighters are well known, with a recent example being described and illustrated in U.S. Pat. No. 4,850,057, issued to Schierenbeck. The Schierenbeck patent discloses firefighters' suspenders having an elastic portion located at the ends of the suspenders comprised of flame-resistant neoprene. The flexible end straps are located at the front of the suspenders, and are attached to the longer leather straps which comprise the majority of the suspenders. The neoprene material, however, is only able to withstand short duration, direct flame contact (col. 2, lines 20–24). Further, the elastic portion lacks an outer layer which is permanently fire-resistant.

Fire-resistant fabrics, in general, are well known and have applications other than in firefighters' suspenders. For example, U.S. Pat. No. 5,069,957 (Vandermeersch) discloses a fire-resistant elastic strap used in the construction of seat or bed suspensions. Each thread of the elastic strap includes an elastic core surrounded by cladding thread. The cladding thread is made from fire-resistant viscose, anti-fire polyester, chlorinated fibers, or Aramid® fibers. Vandermeersch, however, does not disclose a permanently fire-resistant outer layer. Further, the strap is adapted for use in a seat or bed, rather than in firefighters' suspenders.

Cooke et al., U.S. Pat. No. 4,996,099, discloses a fire-resistant fabric comprised of corespun yarns. The fabric is suitable for use as a flame barrier in applications such as upholstered articles or office panel. Each corespun yarn comprises a core of fire-resistant fibers and an outer sheath of modacrylic intumescent fibers. The Cooke reference, however, does not disclose corespun yarns having an elastic core, and discloses only two materials per yarn.

Many of the yarns currently available are not permanently fire-resistant. Further, in the field of firefighters' suspenders, the suspenders currently available are not limited-stretch and permanently fire-resistant. Many fabrics used in fire-resistant firefighters' suspenders deteriorate over time due to use and/or washing and, therefore, lose much of their fire-resistant capability. The limited-stretch feature provides a secure fit and allows firefighters substantial freedom of movement. Fully elastic suspenders would provide a less secure fit and would not perform well given the heavy weight of the firefighters' bunker pants.

It is seen, therefore, that there is a need for improvements to the materials utilized in firefighters' suspenders, including making such materials permanently fire-resistant and capable of limited stretch.

SUMMARY OF THE INVENTION

Firefighters' suspenders according to the present invention which meet this need comprise a plurality of elastic straps attached to at least two nonelastic shoulder straps. The ends of the straps contain means for fastening the straps to firefighters' pants. Both the elastic and the nonelastic straps include a permanently fire-resistant fabric such that the elastic and nonelastic straps are permanently fire-resistant.

The fabric of the elastic straps comprises an elastic core, fire-resistant yarn forming an intermediate layer wrapped around the elastic core, and a permanently fire-resistant outer layer wrapped around the elastic core and the fire-resistant intermediate layer. These fibers are cross-woven with a permanently fire-resistant fiber. In a second embodiment, the fire-resistant yarn of the intermediate layer may be replaced with a permanently fire-resistant material, such as that used in the outer layer.

The nonelastic straps are woven of permanently fire-resistant material, such as halogenated modacrylic, or other permanently fire-resistant material such as that used in the outer layer of the elastic straps. The nonelastic straps may contain reflective markings which are visible when the ends of the suspenders are fastened to the firefighters' pants. These markings have clear benefits to firefighters engaged in traffic control.

The first ends of the elastic straps and nonelastic straps are joined together using a fire-resistant thread. A leather patch may be used to provide reinforcement at the point where the elastic straps are joined to the nonelastic straps. Clips are provided on the second ends of the elastic and nonelastic straps for fastening these ends to the firefighters' pants, which typically possess buttons for this purpose.

DETAILED DESCRIPTION OF THE PREFERRED EMBODIMENTS

Figure 1:
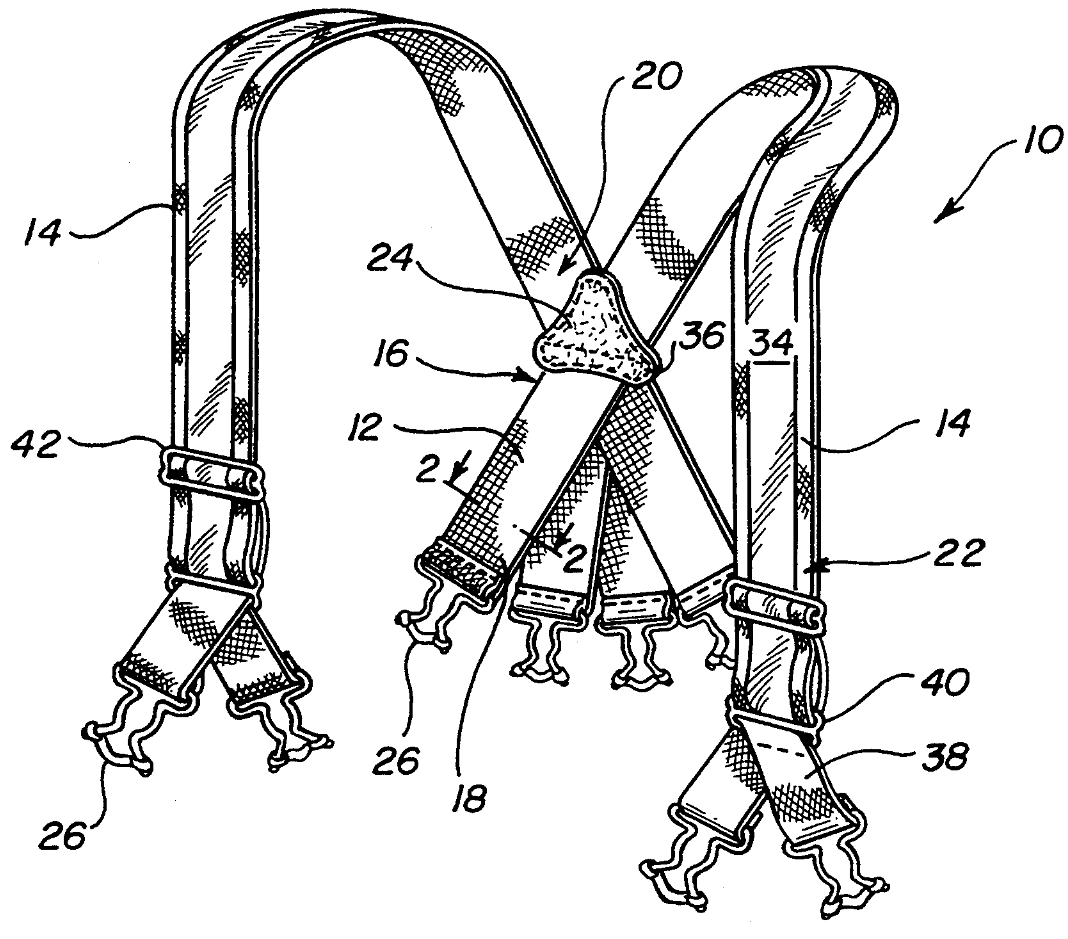
FIG. 1 is a perspective view of the present invention, illustrating the elastic straps, nonelastic straps, fluorescent markings and clips for fastening the straps to a firefighter's pants.

Reference is made to FIG. 1, which depicts firefighters' suspenders 10 comprising a plurality of elastic straps 12 and at least two nonelastic shoulder straps 14. The first ends 16 of the elastic straps 12 are collectively attached to the first ends 20 of nonelastic straps 14. Back junction 24 may be used to provide reinforcement at the point where first ends 16 and 20 are joined. Preferably, back junction 24 is generally triangular in shape and comprises two leather patches which are sewn together using fire-resistant thread 36 such that first ends 16 and 20 are contained between the two leather patches.

Fastening means are provided on the second ends 18 of the elastic straps 12 and on the second ends 22 of the nonelastic straps 14. In the preferred embodiment of the present invention, the fastening means connected to second ends 22 of nonelastic straps 14 comprise double-loop connectors 40, fastening straps 38, and clips 2.6. The fastening means connected to second ends 18 of elastic straps 12 simply comprise clips 26. Clips 26 are used to fasten the ends 18 and 22 to firefighters' pants (not shown), which typically possess buttons adapted to receive clips 26. Second ends 18 of elastic straps 12 fasten to the rear of the firefighters' pants, while second ends 22 of nonelastic straps 14 fasten to the front of the pants. Clips 26 are preferably spring-action to provide a more secure fit over the buttons, while still allowing for pivoting around the buttons. Slide adjusters 42 are provided along the nonelastic straps 14 in order that the length of the suspenders 10 may be adjusted. Clips 26, double-loop connectors 40, and slide adjusters 42 are all preferably constructed of brass-plated steel. Elastic straps 12 and nonelastic straps 14 both are constructed of permanently fire-resistant yarn such that elastic straps 12 and nonelastic straps 14 are permanently fire-resistant.

Figure 2:
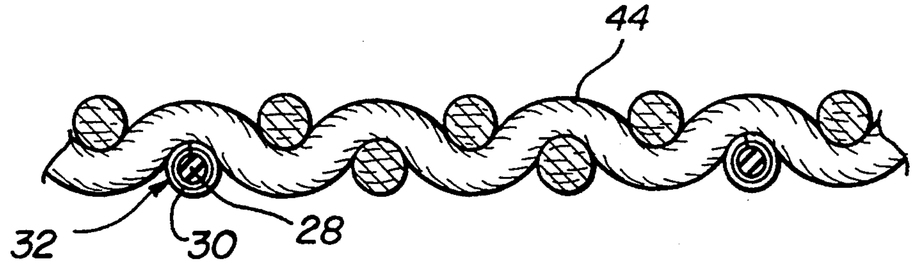
FIG. 2 is a cross-sectional view taken along line 2—2 of FIG. 1 which illustrates the individual fibers comprising an elastic core, wound with a fire-resistant intermediate layer followed by a permanently fire-resistant outer layer, and woven together using a permanently fire-resistant weft.

Referring now to FIG. 2, the fabric of the elastic straps comprises an elastic core 28, an intermediate layer 30 wrapped around the elastic core 28, and an outer layer 32 wrapped around the elastic core 28 and intermediate layer 30. The elastic core 28 is preferably comprised of neoprene, which is well known in the art. The fire-resistant intermediate layer 30 is preferably comprised of fire-resistant polyester. Although polyester is not typically fire-resistant in its usual form, it may be treated so as to cause it to exhibit fire-resistant properties. Such fire-resistant polyester is available from Hoechst Celanese Corporation. The outer layer 32 is permanently fire-resistant and is comprised of a self-extinguishing fiber, such as halogenated modacrylic. Suitable alternatives to halogenated modacrylic exist, such as Nomex ® and Kevlar ®, both produced by and available from E.I. du Pont de Nemours & Company, and polybutylisocyanate (PBI), which is commercially available from Hoechst Celanese Corporation. In a second embodiment, the fire-resistant polyester of intermediate layer 30 is replaced with a permanently fire-resistant material, such as that used in outer layer 32.

Referring, again, to FIG. 1, nonelastic straps 14 are constructed of permanently fire-resistant material, such as halogenated modacrylic, or any of the other permanently fire-resistant materials described above. The nonelastic straps 14 contain reflective markings 34 which are visible when the ends of the suspenders are fastened to the firefighters' pants. Markings 34 may consist of Scotchlite ® retroreflective trim, which is produced by and available from 3M Corporation. These markings 34 have clear benefits to firefighters engaged in traffic control.

Figure 3:
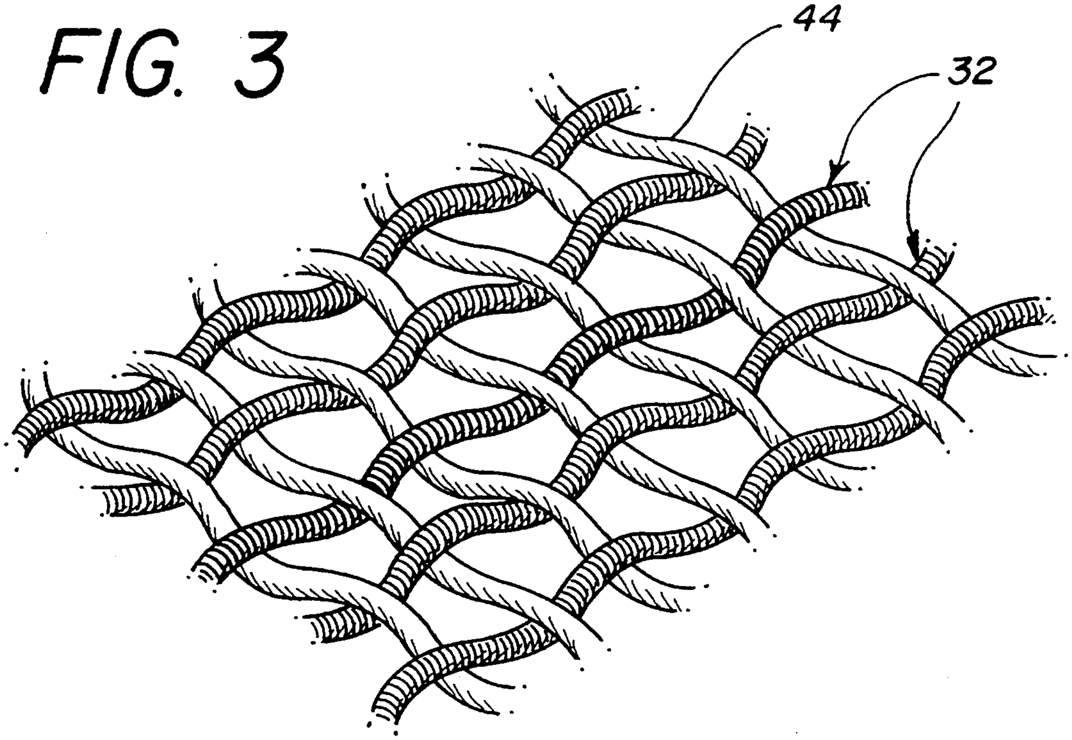
FIG. 3 is an exploded view of the individual fibers woven together. Each fiber in FIG. 3 comprises an elastic core, a fire-resistant intermediate layer, and a permanently fire-resistant outer layer.

Reference is now made to FIG. 3, which illustrates the plain weave construction of the elastic straps 12. The individual elastic fibers run in a direction parallel to the length of suspenders 10 and are woven in a cross-linked pattern with a permanently fire-resistant weft 44, which runs in a direction perpendicular to the length of the suspenders 10. This permanently fire-resistant weft 44 may comprise halogenated modacrylic or any other permanently fire-resistant material.

Figure 4:
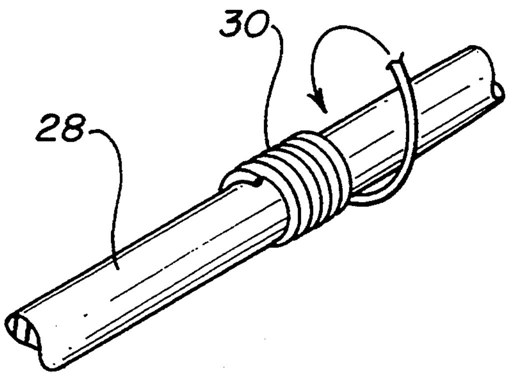
FIG. 4 is an exploded view of an individual elastic fiber and illustrates the manner in which the intermediate layer is wrapped around the elastic core.

FIG. 4 illustrates the manner in which the intermediate layer 30 is wrapped around elastic core 28 substantially perpendicular to the length of elastic core 28. Once intermediate layer 30 is wrapped to cover elastic core 28, permanently fire-resistant outer layer 32 (not shown) is wrapped in a similar fashion around intermediate layer 30 and elastic core 28.

What is claimed is:

1. Limited-stretch firefighters suspenders comprising:
a plurality of elastic straps, each having first and second ends and woven from a yarn comprising
an elastic core comprised of neoprene,
a fire-resistant polyester intermediate layer wrapped around said elastic core, and
a permanently fire-resistant outer layer of halogenated modacrylic wrapped around said elastic core and said fire-resistant polyester intermediate layer;
at least two nonelastic straps, each having reflective markings and first and second ends, wherein said first ends of said nonelastic straps are collectively attached to said first ends of said elastic straps; and
means for fastening said second ends of said elastic straps and said nonelastic straps to firefighters' pants, wherein said elastic straps and said nonelastic straps are constructed of halogenated modacrylic such that said elastic straps and said nonelastic straps are permanently fire-resistant.

2. Firefighters' suspenders as claimed in claim 1, wherein said elastic straps and said nonelastic straps are sewn together with a fire-resistant thread.

* * * * *